May 17, 1966 R. M. LA PENNA 3,251,105
POP MOLDING CLIP
Filed Dec. 11, 1964

INVENTOR.
ROSE M. LA PENNA
BY
ATTORNEYS

United States Patent Office 3,251,105
Patented May 17, 1966

3,251,105
POP MOLDING CLIP
Rose M. La Penna, 627 Fulton, Grand Haven, Mich.
Filed Dec. 11, 1964, Ser. No. 417,561
6 Claims. (Cl. 24—73)

This invention relates to a molding clip, and more particularly to a spring wire molding clip capable of being snapped or popped directly into engagement with a slotted molding strip at any selected position for retaining the elongated molding strip on an orifice sheet material surface such as an automobile body.

Of the basic types of molding clips, spring wire clips are often preferred for reasons of ease of manufacture, ability to form the clips on conventional wire bending apparatus, and general inexpensiveness of stock and forming operations. However, wire clips are normally very tricky to install. In the past, a few clips have been devised to be inserted directly into a particular size strip without being slid along its length, but these had to be specifically sized to fit exact size strips. Normally, a clip to fit various size and configuration strips must be inserted in the end of the molding strip and carefully slid along to the desired location in the strip. Even after mounting, wire type molding clips usually have the undesirable characteristic of mounting instability, including the tendencies to rock, wiggle, tip or bend. They contact the strip at two points of contact, at the free wire ends, thereby being susceptible to tipping, or alternatively have elongated leg portions in continuous contact with the molding strip, thereby being susceptible to rocking on high spots.

It is an object of this invention to provide a unique wire molding clip that can actually be popped directly into place in the strip at any selected position of the strip, without sliding it along from an end merely by squeezing it together and allowing it to snap in place. Moreover, it can be inserted with a simple tool such as a pair of pliers, with a minimum of effort and only an instant of time. The clip is rigid and secure when inserted, resisting any force tending to slide it along the strip, although allowing sliding adjustment if squeezed slightly. It can be removed just as readily by squeezing it again, as with pliers. The clip will adapt to various size and configuration molding strips due to its substantial expansion capacity when squeezed and released.

Another object of this invention is to provide a snap-in-place spring wire molding clip that not only has inexpensiveness, ease of manufacture, and simple insertion and removability, but also has excellent stability with capacity to secure anchor a molding strip with a locking action that does not allow the clip to tilt, lock, tip or shift, and does not allow the strip to be flexed away from the sheet to which it is attached. The clip has multiple point contact at spaced locations at the four main extremities of its extent.

It is another object of this invention to provide a novel wire clip having portions which double back over each other in a unique manner to anchor elongated zones of the wire under the greatest strain.

Another object of this invention is to provide a wire pop clip formed of one continuous piece of wire, and having unique four point contact of the clip on the molding strip to be attached, two on each side flange of the strip, and effecting excellent stability in interlocking fashion.

These and several other objects of this invention will become apparent upon studying the following specification in conjunction with the drawings in which.

Figure 1:
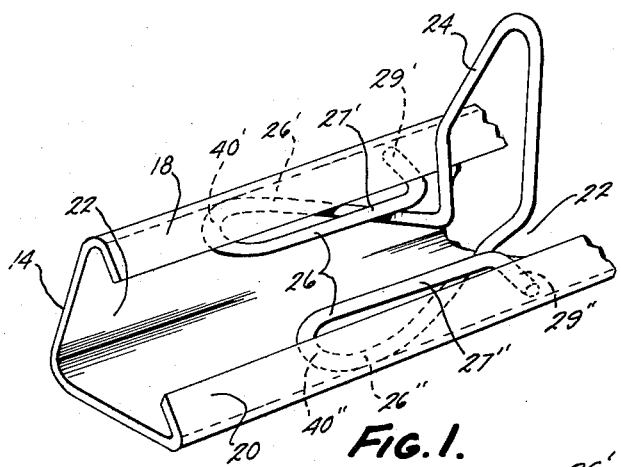
FIG. 1 is a perspective view of the novel clip shown positioned in the back of a section of molding strip to be attached.

Referring now specifically to the drawings, the complete assembly 10 includes orificed sheet material or plate 12 such as the metal body of an automobile, a configuration elongated decorative molding strip 14, and the novel molding clip 16 securing the two together.

In conventional fashion, strip 14 is generally C-shaped, including a pair of spaced co-planar flanges 18 and 20 astraddle an elongated slot opening 22 in the back side of the strip. The front side of the strip may have any of a plurality of different possible cross sectional configurations for the chosen application.

Figure 2:
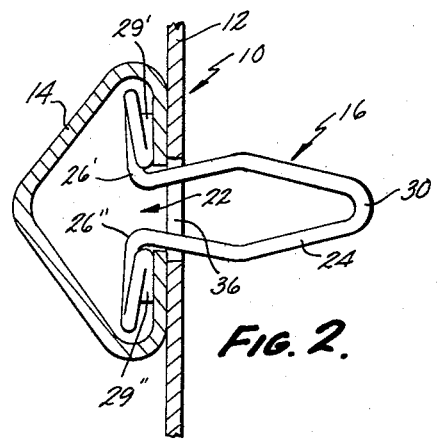
FIG. 2 is a sectional elevational sectional view of the molding strip, shown attached to an orificed sheet with the novel clip.
Figure 3:
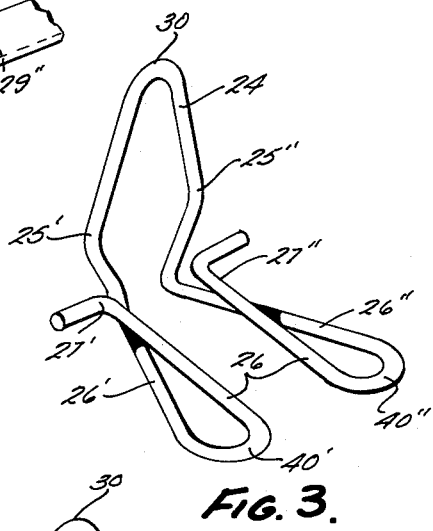
FIG. 3 is a perspective view of the free clip in its relaxed state.

The molding clip includes two main portions, central portion 24 in one plane, forming a snap connector to the orificed sheet material, and second portion 26, in a second plane generally normal to the first plane, forming the pop connection to the molding strip. The complete clip is formed of one integral piece of spring wire. Central portion 24 has an outer end bight 30 from which extends a pair of legs that are divergent generally to their mid-position, then are generally convergent toward the plane of second portion 26, and have a spaced relation at the intersection of the second plane. This forms a pair of cooperative humps 25' and 25'' which, due to the inherent flexibility and resiliency of the legs with respect to the bight of this central portion, are capable of being flexed from the normal outwardly spread position illustrated in FIG. 2, toward each other against the inherent bias of the legs for insertion into a cooperative sheet metal orifice 36. This therefore forms an open diamond. Thus, by inserting the outer narrow bight end in the orifice, and pressing, the legs will be pressed toward each other against the inherent bias to snap the clip into place.

Extending integrally from the spaced legs of this snap end portion is a continuation of these legs in the second plane to form the strip-engaging portion 26. These legs 26' and 26'' diverge with respect to each other as they extend away from the connector end 24, to their widest, laterally spaced positions at the outer ends 40' and 40'' furthest from connector 26. These legs are then bent back upon themselves, by curling first toward each other and a central plane that is perpendicular to both of the first mentioned planes, and then generally parallel to each other back toward the snap connector end, but still generally in the second plane. The doubled back portions 27' and 27'' are therefore closer to each other than the divergent portions 26' and 26''. These doubled back portions intersect and contact the divergent portions, and overlap them, to extend therebeyond. They form an interlocking action to be described. Preferably, the terminal ends of these doubled back portions extend adjacent the snap connector portion 24 and are bent to be generally in the same plane. These terminal free ends 29' and 29'' are substantially normal to parallel portions 27' and 27''. They extend opposite to each other, laterally, in the plane of portion 26. The lateral extent of the free ends is approximately the same as the widest portion of divergent leg portions 26' and 26'', so that, when the clip is engaged with a strip, the clip contacts the molding strip at four points, at the extremities of the portion 26. These contacts are at the deepest opposite edge portions inside the molding strip behind flanges 18 and 20.

It is important that overlapping leg portions 27′ and 27″ be on the side of leg portions 26′ and 26″ closest to the snap end connector and its bight portion (as shown), to lock the attached wire element against bending or flexing when stress is applied. More specifically, when the clip is in position in the strip, assuming that the strip is attached to a sheet metal surface, pulling stress on the clip will be resisted by all portions of the molding clip rather than just the two terminal ends of the legs as usual, since these terminal ends are engaged under leg portions 26′ and 26″ to distribute the stress. Thus, a leverage cannot be obtained on these free ends to cause flexing of the legs, or to tip or bend the legs. Rather the entire clip acts as a rigid unit with resistance at all four corners, so to speak, to resist flexing of the wire clip. Thus the strip is locked tightly to the sheet and cannot be pulled away sufficiently to allow permanent deformation of the clip legs. The particular overlapping construction illustrated is therefore very important to this invention. This overlap should be between the ends of the legs in the second plane, preferably closer free ends 29′ and 29″ than ends 40′ and 40″.

Not only is it important that the doubled back ends 27′ and 27″ be on the side of legs 26′ and 26″ closest the connector 24, but also that the free terminal ends extend beneath the flanges of the molding strip, extending substantially to the same width as the widest portion of end loops 40′ and 40″. There also must be two of these, on opposite sides, in symmetrical fashion, to bind the legs and the clip as a unit.

Figure 5:
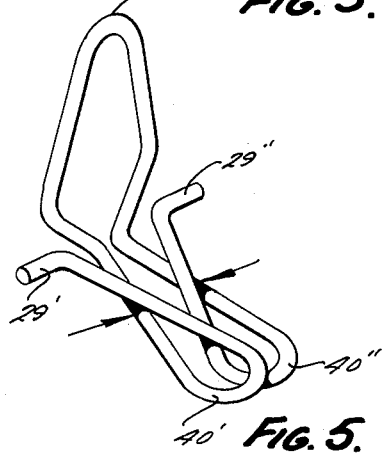
FIG. 5 is a perspective view of the novel clip shown in a compressed state ready for insertion into a molding strip.
Figure 4:
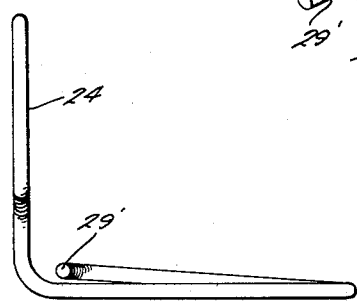
FIG. 4 is a side elevational view of the free clip in FIG. 3.

Attachment of the clip is relatively direct, accurate, quick, and simple. By squeezing the spaced legs of portion 26 together with a pair of pliers or the like, the width of portion 26 is decreased by about 30% or so to enable this portion to be inserted directly into slot 22 between flanges 18 and 20. This temporary deformation is due to torsion in the spaced legs of snap end 24 in the first plane and slight bending of the legs in the second plane until portions 27′ and 27″ are adjacent or even slightly overlapping each other (FIG. 5) and ends 29′ and 29″ are closer for insertion of the clip into the strip. When released, it expands and pops into place. Its four point contact is both against the strip in the plane of portion 26, and against the back side of flanges 18 and 20, to resist rotation in its plane inside the strip, or bending pull-out through slot 22.

In different language, the clip comprises a first elongated open loop portion 24 in one plane with an end bight and a pair of spaced legs with opposite knee humps 25′ and 25″, and a second compressible portion 26 in a second plane normal to the first plane. The second portion is a pair of spaced, closed, elongated loops, with one end of each integrally extending from the spaced legs of the open loop, and the other free ends being laterally divergent in the second plane to a width substantially equal to the greatest width of the outer, curved, loop ends to form a four point contact on the molding strip. The closed loop leg elements adjacent the free ends are parallel, and overlap the other loop leg elements that diverge from the plane of the open loop to the curved outer loop ends, on the side closest the open loop bight.

Attachment of the clip to an orificed sheet metal surface is, as explained previously, merely by inserting the nose of the snap end connector into the orifice and pressing the clip to temporarily deform the legs of the snap end until the large width portion passes through the orifice and inherently spreads to bind the clip in the orifice.

It is conceivable that certain minor details of the clip may be modified within the concept presented provided the specific relationships notes are retained. Therefore, the invention is intended to be limited only by the scope of the appended claims and the reasonably equivalent structure to those defined therein.

I claim:

1. A pop-in-place wire molding clip for securing a flanged molding strip to an orificed plate, comprising: an integral continuous wire have a first, open-loop, central, plate connector portion in one plane, and a second portion in a second plane substantially normal to said one plane; said second portion comprising a pair of spaced elongated closed loops; one end of each of said closed loops being integral with said open loop, and the other ends of said closed loops being free, divergent, molding strip engagement ends; the part of each of said closed loops adjacent the free end thereof overlapping the other part of the respective closed loop toward said open loop, to form interlocking means; and said second clip portion being temporarily compressible in its plane to a smaller dimension, against an inherent bias, by compression of said closed loops toward each other, to allow the clip to snap into a molding strip when released for expansion.

2. A pop-in-plane wire molding clip for securing a flanged, molding strip to an orificed plate, comprising: an integral continuous wire having a first, open-loop, central, plate connector portion in one plane, and a second portion in a second plane substantially normal to said one plane; said open loop being elongated, having an end bight and a pair of spaced legs thereform, said legs having a pair of oppositely humped knees for insertion inside and retention behind a plate orifice; said second portion comprising a pair of spaced elongated closed loops; one end of each of said closed loops being integral with said open loop, and the other ends of said closed loops being free, divergent molding strip engagement ends; the parts of said closed loops adjacent said free ends being substantially parallel elements, and the other parts being divergent elements from said open loop to outer, spaced, flange-engaging loop ends; said parallel elements overlapping said divergent elements on the side toward said open loop, to form interlocking means; and said free divergent ends having their greatest lateral extents in said second plane substantially equal to the greatest extent of said outer loop ends, to form four point engagement with a molding strip.

3. A wire molding clip comprising: a continuous wire generally in two planes substantially normal to each other, including a central snap connector bight portion in one plane for connection to an orifice sheet, and a pair of integral, spaced legs in the other plane extending from said central portion, for connection to a molding strip; said legs extending to outer spaced ends, then doubled back to overlap said legs on the side of said legs toward said bight, and terminating in free ends with a lateral spacing from each other about the same as that of said outer spaced ends.

4. A molding clip comprising an integral piece of wire having a central projecting snap end with a bight, and a pair of spaced legs extending integrally from said snap end in a plane generally normal to the plane of said snap end; said legs having first portions laterally divergent with respect to each other away from said end to a pair of spaced, outer, looping ends; said legs each being doubled back upon itself from said looping ends toward said snap end to form parallel portions; said parallel portions overlying, and extending beyond said divergent portions, on the side thereof closest said bight; and said parallel portions terminating in free ends projecting laterally to a dimension about equal to the widest dimension of said looping ends.

5. A pop-in wire molding clip to secure a flanged molding strip to an orificed sheet, comprising: a single integral wire generally in two planes substantially normal to each other; said clip being symmetrical with respect to a central third plane normal to the first two; the central portion of said clip being in the first plane, having a pair of spaced legs which are divergent and then convergent to an end bight, forming a snap connector for an orificed sheet; said legs being extended into the second plane substantially normal to the first plane to form a molding strip engaging portion; the portions of said legs in said second plane being spaced and laterally divergent from said first plane to a pair of strip engaging loop extremities, and then being doubled back on themselves from said loop extremities to form interlock portions; said interlock portions overlying said divergent leg portions on the side of said divergent leg portions closest said bight; and said interlock portions having free flange engaging ends which extend laterally, opposite each other, to the extent of said loop extermities, to form a four point connection with a molding strip; and said legs being temporarily deformable toward each other about said bight against an inherent bias to temporarily reduce the clip width for poping it into a molding strip.

6. A molding strip assembly comprising: an elongated molding strip having a general C-shaped cross sectional configuration, including a pair of co-planar flanges astraddle an elongated slot; a clip attached thereto comprising an integral continuous wire having a first, open-loop, central, plate connector portion in one plane, and a second portion in a second plane substantially normal to said one plane; said open loop being elongated, extending out through said strip slot, and having an end bight and a pair of spaced legs therefrom; said legs having a pair of oppositely humped knees for insertion inside and retention behind a plate orifice; said second portion comprising a pair of spaced elongated closed loops engaged behind said strip flanges; one end of each of said closed loops being integral with said open loop, and the other ends of said closed loops being free, divergent molding strip engagement ends; the parts of said closed loops adjacent said free ends being substantially parallel elements, and the other parts being divergent elements from said open loop to outer, spaced, flange engaging loop ends; said parallel elements overlapping said divergent element on the side toward said open loop, to form interlocking means against outward force on said open loop; and said free divergent ends having their greatest lateral extend in said second plane substantially equal to the greatest extent of said outer ends to form a four point engagement with said molding strip, both in said second plane against the outer opposite edges of said strip, and against the inside faces of said flanges of the strip.

References Cited by the Examiner

UNITED STATES PATENTS

| | | | |
|---|---|---|---|
| 2,124,252 | 7/1938 | Lavigne | 52—718 |
| 2,221,009 | 11/1940 | Van Uum | 24—215 |

WILLIAM FELDMAN, *Primary Examiner.*

E. SIMONSEN, *Assistant Examiner.*